(12) United States Patent
Watson

(10) Patent No.: US 7,036,024 B2
(45) Date of Patent: Apr. 25, 2006

(54) DETECTING COLLUSION AMONG MULTIPLE RECIPIENTS OF FINGERPRINTED INFORMATION

(75) Inventor: Stephen Watson, Toronto (CA)

(73) Assignee: Kaleidescape, Inc., Mountain View, CA (US)

(*) Notice: Subject to any disclaimer, the term of this patent is extended or adjusted under 35 U.S.C. 154(b) by 149 days.

(21) Appl. No.: 10/378,046

(22) Filed: Feb. 28, 2003

(65) Prior Publication Data

US 2004/0010692 A1 Jan. 15, 2004

Related U.S. Application Data

(63) Continuation of application No. 10/356,692, filed on Jan. 31, 2003, which is a continuation of application No. 10/356,322, filed on Jan. 31, 2003.

(60) Provisional application No. 60/394,630, filed on Jul. 9, 2002, provisional application No. 60/394,922, filed on Jul. 9, 2002, provisional application No. 60/394,588, filed on Jul. 9, 2002.

(51) Int. Cl.
G06F 1/24 (2006.01)
(52) U.S. Cl. .................................. 713/200; 713/201
(58) Field of Classification Search ................ 713/176; 380/201, 203
See application file for complete search history.

(56) References Cited

FOREIGN PATENT DOCUMENTS

WO WO 2004/070585 A2 8/2004

OTHER PUBLICATIONS

Combining digital watermarks and collusion secure fingerprints for customer copy monitoring; Dittmann, J.; Secure Images and Image Authentication (Ref. No. 2000/039), IEE Seminar on, Vol., Iss., 2000; pp.: 6/1-6/6.*

Boneh, Dan et al. "Collusion-Secure Fingerprinting for Digital Data." IEEE Transactions on Information Theory, 1998, pp. 1897-1905, vol. 44, No. 5.

* cited by examiner

Primary Examiner—Thomas R. Peeso
(74) Attorney, Agent, or Firm—Swernofsky Law Group PC

(57) ABSTRACT

Embedding fingerprinting or watermarking information includes delivering information in-band within digital content representing a media stream, so unauthorized distributors must choose between degrading the media stream, or leaving sufficient information detectable that unauthorized distribution can be detected. For fingerprinting, the method provides a relatively high degree of confidence of both detecting at least one colluding unauthorized distributor, and not falsely accusing any innocent party of being an unauthorized distributor. Embedding fingerprinting or watermarking information includes selecting a sequence of locations within digital content, and embedding information in the form of a sequence of one or more bits at each of those locations, thus representing a set of marking symbols. Marking symbols cannot be readily manufactured without at least one colluding unauthorized distributor having received it, so any distributed digital content includes at least some marking symbols traceable to at least one colluding unauthorized distributor.

110 Claims, 3 Drawing Sheets

DETECTING COLLUSION AMONG MULTIPLE RECIPIENTS OF FINGERPRINTED INFORMATION

BACKGROUND OF THE INVENTION

1. Field of the Invention

The invention relates to distribution of digital content.

2. Related Art

Distribution of digital content for media streams, such as for example movies, is subject to several problems. One problem is that it is easy to make exact copies of digital content, thus allowing any recipient of that content to redistribute it, whether authorized or not. It would be advantageous to be able to distribute digital content, particularly digital content for media streams, without fear of its unauthorized distribution. This would be particularly advantageous when it is desired to distribute digital content using a communication link, such as for example a computer network or other technique for distribution to end viewers (for example, either on demand, in anticipation of future demand, or in response to something else).

One known solution is to mark digital content with a "fingerprint," that is, information sufficient to identify the recipient of the digital content, so that an unauthorized distributor of the content can be determined, thus hopefully deterring potential unauthorized distributors. Other known solutions include marking digital content with a "watermark," that is, information sufficient to identify the digital content itself. Thus for example, if a recipient of the digital content distributes it without authorization, that recipient can be identified and called to account for that activity. However, fingerprinting and watermarking of digital content is subject to attacks by recipients, by which those recipients might be able to erase or alter the fingerprint or watermark, or to otherwise make copies of the digital content from which it is difficult or impossible to determine the unauthorized distributors. Possible attacks include (1) alteration or erasure of the fingerprinting or watermarking information, (2) collusion among multiple recipients to mix fingerprinting or watermarking information together, and (3) combinations of multiple attacks.

Known techniques for countering attacks against fingerprinting information have been directed to detecting colluders. However, such known techniques, to the extent they are effective, are also subject to another important problem—avoiding accusation of innocent recipients. Moreover, such known techniques are relatively ineffective when the number of colluders is more than a few. For example, one known technique can be defeated by as few as 8–10 colluders, even when using millions of bits of embedded fingerprinting or watermarking information.

It would be advantageous to provide a technique by which attacks against fingerprinting and watermarking can be thwarted, with the effect that recipients responsible for distributed digital content can be identified notwithstanding such attacks.

SUMMARY OF THE INVENTION

A method of embedding fingerprinting or watermarking information includes delivering information in-band within digital content representing a media stream, with the effect that unauthorized distributors are forced to choose between (A1) degrading the media stream to no longer be commercially valuable, or (A2) leaving sufficient fingerprinting or watermarking information detectable in the digital content representing the media stream that unauthorized distribution can be detected with a relatively high degree of confidence. In the case of fingerprinting (including when the embedded information in the digital content representing the media stream is sufficient to identify a recipient of the media stream), the method provides relatively high degree of confidence of both (B1) detecting at least one of a team of colluding unauthorized distributors, and (B2) not falsely accusing any innocent party of being an unauthorized distributor.

The method of embedding fingerprinting or watermarking information includes selecting a sequence of locations within digital content representing the media stream, and embedding information in the form of a sequence of one or more bits (or fractions of a bit) at each of those locations, with the effect of representing a set of marking symbols. The embedded information is selected pseudo-randomly, with the effect that the marking symbols cannot readily be manufactured without at least one colluding unauthorized distributor having received that marking symbol. While it is conceivable that a marking symbol could be manufactured without having been received by at least one colluding unauthorized distributor, there is a very small probability of the colluding unauthorized distributors being able to do so, either individually or collectively. This has the effect that any distributed digital content (still having commercial value) includes at least some residual information, with the effect that the digital content would be traceable to at least one of the colluding unauthorized distributors. Probability theory allows the method to identify that residual information, with the effect that the method can identify at least one colluding unauthorized distributor with relative confidence that the identified party is truthfully an unauthorized distributor and not falsely accused.

In one aspect of the invention, symbols are selected pseudo-randomly, in response to pseudo-random functions that need only be statistically pseudo-random, not necessarily cryptographically pseudo-random, but are cryptographically secure against ciphertext-only attacks. For each symbol that might be embedded in the digital content, fingerprinting or watermarking information detected in post-attack digital content is compared with fingerprinting or watermarking information embedded in original digital content. The method performs one or more statistical tests to evaluate whether the embedded symbol from the original digital content is detectable in the post-attack digital content. In one embodiment, the statistical tests include assigning accused distributors a weighted point-count, in response to whether the detected symbol equals the embedded symbol. This has the effect that, in response to a total weighted point-count, it can be determined with relatively high confidence whether an accused distributor is truthfully an unauthorized distributor or not.

In one embodiment, each set of digital content, associated with an identifier n, is assigned a unique sequence of r marking symbols, where r is relatively large, each symbol of which is selected from an alphabet of k possibilities, encoded in a bit sequence $P_n(X)$, where X represents the media stream (such as for example a movie) being watermarked or fingerprinted, and $I(X)$ represents a set of possible locations at which information might be embedded in the digital content representing X. The unique sequence is selected in response to the identifier n, in response to a pseudo-random function $R_n(\ )$: r→k, with the effect that the function $R_n(\ )$ defines the unique sequence of symbols associated with the identifier n. (The identifier n might identify the sender of the digital content, the recipient thereof, or an individual event such as a selected sender/recipient interaction or a selected presentation of the media stream, such as an individual presentation at a movie theater.) The unique sequence is further encoded within the actual fingerprinting or watermarking information in response to a pseudo-random function $p(\ ): I(X) \to r \cdot (k-1)$, with the effect that each marking symbol is distributed across a set of bits within $P_n(X)$ that are not readily identifiable by an attacker, with the effect that attackers cannot readily determine if a selected symbol was embedded in the original digital content. The combination of the two functions $R_n(\ )$ and $p(\ )$ produces a set of embedded fingerprinting or watermarking information, with the effect that recipients of the original digital content cannot readily both remove the embedded information and maintain the quality of the media stream represented by the original digital content.

The invention is not restricted to movies, but is also applicable to other media streams, such as for example animation or sound, as well as to still media, such as for example pictures or illustrations, and to databases and other collections of information.

INCORPORATED DISCLOSURES

Figure 1:
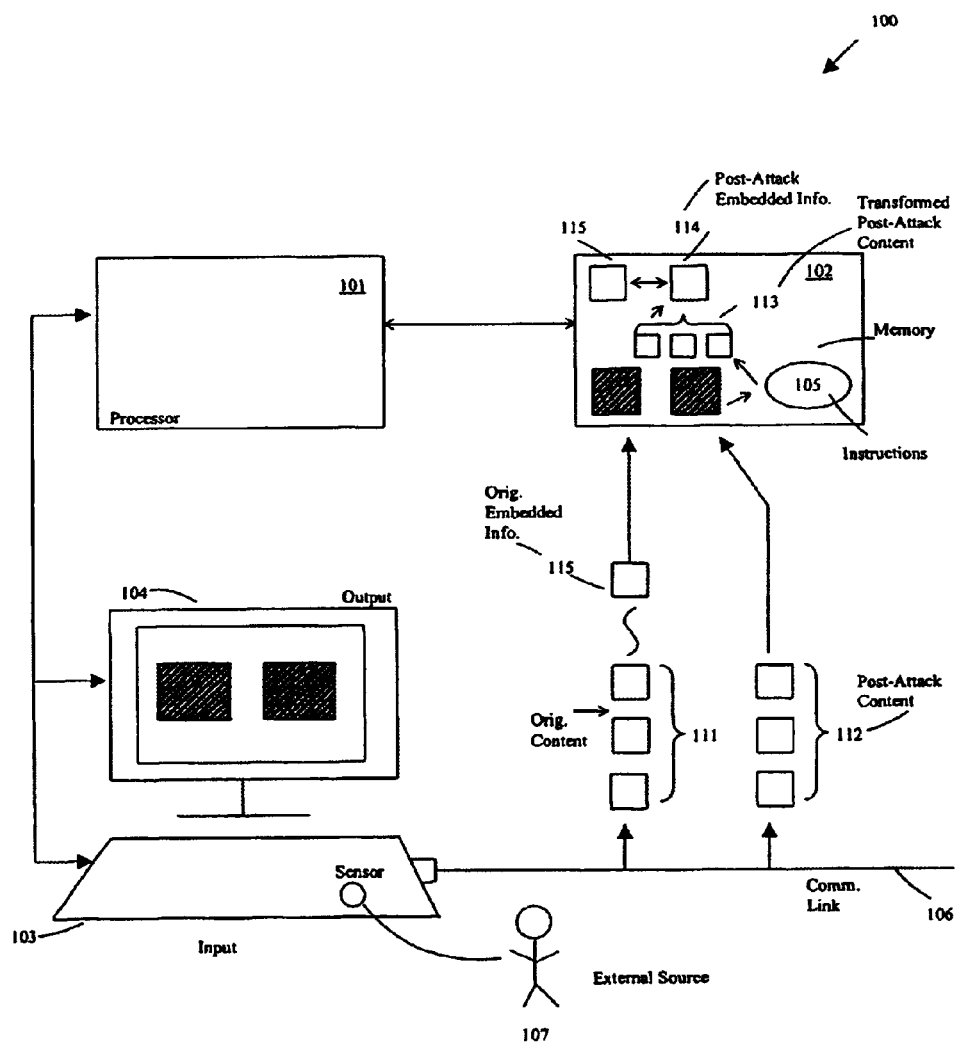
FIG. 1 shows a block diagram of a system for detecting collusion among multiple recipients of fingerprinted information.

This application claims priority of the following documents, each of which is hereby incorporated by reference as if fully set forth herein.

U.S. provisional patent application 60/394,630, filed Jul. 9, 2002, in the name of Michael Malcolm, Stephen Watson, Daniel Collens, and Kevin Hui, titled "Watermarking and Fingerprinting a Movie for Secure Distribution."

U.S. provisional patent application 60/394,922, filed Jul. 9, 2002, in the name of Michael Malcolm, Stephen Watson, and Daniel Collens, titled "System Architecture of a System for Secure Distribution of Media."

U.S. provisional patent application 60/394,588, filed Jul. 9, 2002, in the name of Michael Malcolm, Stephen Watson, and Daniel Collens, titled "Topology of Caching Nodes in a System for Secure Delivery of Media Content."

U.S. patent application Ser. No. 10/356,692, filed Jan. 31, 2003, in the name of Daniel Collens, Stephen Watson, and Michael Malcolm, titled "Parallel Distribution and Fingerprinting of Digital Content".

U.S. patent application Ser. No. 10/356,322, filed Jan. 31, 2003, in the name of Stephen Watson, Daniel Collens, and Kevin Hui, titled "Watermarking and Fingerprinting Digital Content Using Alternative Blocks to Embed Information".

U.S. patent application Ser. No. 10/377,266, filed Feb. 28, 2003, in the name of the same inventor as this application, titled "Recovering from De-Synchronization Attacks Against Watermarking and Fingerprinting".

These documents are hereby incorporated by reference as if fully set forth herein, and are sometimes referred to herein as the "incorporated disclosures".

Inventions described herein can be used in combination or conjunction with technology described in the incorporated disclosures.

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The general meaning of each of these following terms is intended to be illustrative and in no way limiting.

The phrase "media stream" describes information intended for presentation in a sequence, such as motion pictures including a sequence of frames or fields, or such as audio including a sequence of sounds. As used herein, the phrase "media stream" has a broader meaning than the standard meaning for "streaming media," (of sound and pictures that are transmitted continuously using packets and that start to play before all of the content arrives). Rather, as described herein, there is no particular requirement that "media streams" must be delivered continuously. Also as described herein, media streams can refer to other information for presentation, such as for example animation or sound, as well as to still media, such as for example pictures or illustrations, and also to databases and other collections of information.

The phrase "digital content" describes data in a digital format, intended to represent media streams or other information for presentation to an end viewer. "Digital content" is distinguished from packaging information, such as for example message header information. For the two phrases "digital content" and "media stream," the former describes a selected encoding of the latter, while the latter describes a result of presenting any encoding thereof.

The phrase "embedded information in a media stream" describes information incorporated into a set of digital content representing that media stream, in a form capable of later detection. For example, digital content representing media streams might include embedded information, such that the media streams are still capable of presentation to viewer without substantial change, but in which the embedded information can be recovered by suitable processing of the digital content.

The phrase "embedding information in a media stream" describes generating a set of digital content representing that media stream, for which the digital content both represents the streaming media and also includes the embedded information in a form capable of later detection.

The phrase "asymmetrically distributing information" describes selecting locations in digital content where embedded information is to be located, where those locations are selected in a manner that there are no particular global requirements regarding the locations selected for each bit of embedded information. For some examples, not intended to be limiting in any way, (1) the number of locations selected at which to embed each bit might be different for distinct bits, (2) the pattern of locations selected at which to embed each bit might be different for distinct bits, (3) the locations at which to embed each bit might be pseudo-randomly selected.

The term "watermark" describes a schema for digital content by which information can be embedded into that digital content. In preferred embodiments, as described in related applications, an attacker cannot easily remove the watermark. However, the concept of a watermark as described herein is sufficiently general to include watermarks that are not so resistant to attack, or which use other techniques for embedding information.

The term "fingerprint" and the phrase "embedded identifying information" describe sets of information sufficient to identify at least one designated recipient of digital content. In a preferred embodiment, as described in a related application, multiple attackers colluding together cannot easily remove the fingerprint provided by the invention, or prevent at least one of them from being detected as unauthorized distributor of the digital content. However, the concept of the fingerprint as described herein is sufficiently general to include fingerprints that are not so resistant to removal, or do not provide such capability for detecting unauthorized distributors of the digital content, or which use other techniques for embedding information, for detecting the embedded information, or for detecting unauthorized distributors of the digital content. As described in the incorporated disclosure and in related applications, a "watermark" refers to a set of locations in a media stream at which information might be embedded, while a "fingerprint" refers to the actual information that is embedded, such as for example by selecting a block or alt-block for each such location. However, in the context of the invention, there is no requirement that the concepts of watermarking and fingerprinting be so restricted. More generally, a watermark might be used for any technique by which a source of the digital content for the media stream might be identified, or a fingerprint might be used for any technique by which a recipient of the digital content for the media stream might be identified. For example, not intended to be limiting in any way, watermarking and fingerprinting information as described herein includes a representation of the entire path (or set of paths) by which the digital content representing the media stream was sent from its source and received by its end viewer (or equipment associated therewith).

The phrase "identifying information" describes, generally, either information associated with a watermark, information associated with a fingerprint, or other information by which authorized or unauthorized distribution of digital content representing a media stream might be identified.

The phrase "residual information" describes, generally, any information recoverable from digital content from which at least a portion of the identifying information can be associated with that digital content, even if that digital content has been altered significantly since its original distribution or receipt.

The phrase "marking symbol" describes information included as part of the embedded identifying information. In one embodiment, marking symbols are embedded, from which residual information might be recovered even from post-attack digital content. Techniques for selecting and embedding marking symbols are described herein, having the effect that colluding attackers of the digital content must (unless there are a very large number of them) retain sufficient residual information with the effect that at least one of them can be identified with a high degree of confidence, and with the effect that, also with a high degree of confidence, no innocent recipient is falsely identified.

The phrases "original movie" and "alt-movie" describe alternative versions of the same media stream, such as one being an original version of that media stream introduced into a system using aspects of the invention, and another being an alternative version of that same media stream generated in response to the original movie. Similarly, the phrases "original block" and "alt-block" describe alternative versions of the same individual block or macroblock within the original movie or alt-movie. As described in a related application, a difference between the original movie and the alt-movie is historical, in that the alt-movie can be substituted for the original movie in nearly every respect. Similarly, a difference between any one original block and its associated alt-block is historical, in that the alt-block can be substituted for the original block in nearly every respect.

The phrases "original digital content" and "altered digital content" (or in the latter case, "post-attack digital content") describe digital content representing media streams, in a first format (original digital content) and in a second format (altered digital content), the altered digital content having been produced in response to the original digital content and with the intent of representing substantially similar media streams, but with the effect that detecting identifying information from the original digital content is made relatively difficult. Thus, the altered digital content is a result of a de-synchronization attack on the original digital content. In preferred embodiments, the original digital content might be an actual original of some digital content before it was subject to a de-synchronization attack, or might be a constructed form of digital content, such as in response to an original movie and alt-movie, or in response to a set of original blocks and alt-blocks. For one example, not intended to be limiting in any way, the original digital content might be an average of the original movie and the alt-movie, or there might be two sets of original digital content, one for the original movie and one for the alt-movie. In one embodiment, a typical case of original digital content will include a block-by-block selection from the blocks of the original movie and the alt-movie. However, in the context of the invention, there is no particular restriction to such formats being used or included as the "original digital content" for which resynchronization is sought. Moreover, as described below, numerous variations on this theme are all within the scope and spirit of the invention, and would be workable without undue experimentation or further invention.

The scope and spirit of the invention is not limited to any of these definitions, or to specific examples mentioned therein, but is intended to include the most general concepts embodied by these and other terms.

Notation

The general meaning of following notation is intended to be illustrative and in no way limiting.

X the media stream (such as for example a movie) being watermarked or fingerprinted;

I(X) the set of possible locations at which bits might be embedded in the watermarked or fingerprinted digital content;

n a substantially unique identifier associated with a selected copy of digital content (as noted above, the identifier n might identify the sender of the digital content, the recipient thereof, or an individual event such as a selected sender/recipient interaction or a selected presentation of the media stream, such as an individual presentation at a movie theater);

$P_n(X): X \rightarrow \{0, 1\}$ the bit sequence associated with the identifier n, which represents the sequence of actual bits of watermark or fingerprint information;

$P^*(X): X \rightarrow \{0, 1\}$ the bit sequence after recovery from alterations made by one or more colluding attackers;

r a number of marking symbols embedded in the digital content (that is, the sequence of marking symbols forms a word of length r such symbols);

k a number of possibilities in an alphabet of possible marking symbols (in one embodiment, as further described herein, the alphabet of possible marking symbols includes those bit strings having no more than one transition from a logical 0 bit to a logical 1 bit, with the effect that each such marking symbol might be represented by k−1 bits, each of which may be represented by one or more bits in the bit sequence $P_n(X)$);

$R_n(\ ): r \rightarrow k$ a pseudo-random function substantially unique to the identifier n, which generates the bit sequence $P_n(X)$;

Z a selected symbol which might be selected by $R_n(\ )$ from the alphabet of k possibilities;

Z* a selected special symbol which might be selected by $R_n(\ )$ from the alphabet of k possibilities, such as with a different probability of being selected by $R_n(\ )$ than other symbols Z from the alphabet of k possibilities;

$p(\ ): I(X) \rightarrow r \cdot (k-1)$ a pseudo-random function which assigns each location within I(X) to represent a selected one of the r marking symbols, and assigns within that marking symbol, one of (k−1) possible bits for representing that marking symbol, with the effect that each selected marking symbol Z has its bits (that is, those bits representing that marking symbol Z) spread among the locations in I(X), with the effect that each of the bits representing the marking symbol Z is assigned to a number of locations (preferably a substantial plurality of locations for each such bit) within I(X), with the effect that attackers cannot readily determine those locations within I(X), and with the effect that attackers cannot readily remove Z or replace Z with a different marking symbol (for one example, the pseudorandom function might be obtained by taking a pseudorandom bijection xi: $I(X) \rightarrow r \cdot (k-1) \cdot J$ for some set J and then defining pi(i) to be the first two coordinates of xi(i)=(r', k', j), that is (r', k'));

B a length of a fixed length marking symbol Z (as described above, in one embodiment, each marking symbol is selected from an alphabet of k possibilities, and each marking symbol selected from the alphabet of k possibilities has a representation using a sequence of k bits, with the effect that B=k for that one embodiment);

B* a length of a variable length marking symbol Z;

+E a weighted value +E added to a total for a possible attacker if the specific marking symbol Z is present in the post-attack fingerprinting or watermarking information at the $r^{th}$ position;

−F a weighted value −F added to a total for a possible attacker if the specific marking symbol Z is not present in the post-attack fingerprinting or watermarking information at the $r^{th}$ position;

p a probability of a specific marking symbol being a specific selected marking symbol Z.

The scope and spirit of the invention is not intended to be limited in any way by any of these definitions or notations, or to specific examples mentioned therein, but is intended to include the most general concepts embodied by these and other notations.

System Elements

FIG. 1 shows a block diagram of a system for detecting collusion among multiple recipients of fingerprinted information.

A system 100 includes a processor 101, program and data memory or mass storage 102, at least one input element 103, and preferably at least one output element 104.

The memory or mass storage 102 is capable of including instructions 105 capable of being executed or interpreted by the processor 101 to perform steps as described herein.

The memory or mass storage 102 is also capable of receiving copies of at least portions of a set of original digital content 111, and copies of at least portions of a set of watermark or fingerprint information 112 to be impressed on the original digital content 111. Either the entire original digital content 111 and watermark or fingerprint information 112, or comparable portions thereof, might be maintained in the memory or mass storage 102.

The memory or mass storage 102 is also capable of receiving copies of at least portions of a set of post-attack digital content 121 (herein sometimes called "altered" digital content), where the post-attack digital content 121 may have been derived from the digital content 111 by means of an attack on the watermark or fingerprint information 112. Either the entire original digital content 111 and post-attack digital content 121, or comparable portions thereof, might be maintained in the memory or mass storage 102.

In those cases where only comparable portions thereof are maintained in the memory or mass storage 102, the at least one input element 103 preferably includes at least one communication link 106, the communication link 106 being capable of receiving the original digital content 111 and post-attack digital content 112, or portions thereof, and capable of coupling them to the memory or mass storage 102.

As described below, the instructions 105 direct the system 100 to perform the following actions:

(A) to generate a set of watermarked or fingerprinted digital content 113 in response to the original digital content 111 and in response to the watermark or fingerprint information 112.

The specific techniques to be applied are further described below.

As described below, the instructions 105 also direct the system 100 to perform the following actions:

(B1) to identify post-attack watermark or fingerprint information 122 in response to the post-attack digital content 121, and (B2) to compare that post-attack watermark or fingerprint information 122 with the original watermark or fingerprint information 112 associated with the original digital content 111, with the effect that (B3) the post-attack digital content 121 can be identified as derivative of the original digital content 111, in the case of watermarking information, or (B4) the post-attack digital content 121 can be identified as derivative of at least one specific copy of the original digital content 111, in the case of fingerprinting information.

The specific techniques to be applied are further described below.

In a preferred embodiment, the system 100 uses a method of watermarking and fingerprinting, and a method for identifying watermarking and fingerprinting information, such as for example described in related applications for watermarking digital content ("WATERMARKING AND FINGERPRINTING DIGITAL CONTENT USING ALTERNATIVE BLOCKS TO EMBED INFORMATION"). In a preferred embodiment, the system 100 uses a method of identifying post-attack watermark or fingerprint information, such as for example described in related applications for identifying post-attack watermark or fingerprint information ("RECOVERING FROM DESYNCHRONIZATION ATTACKS AGAINST WATERMARKING AND FINGERPRINTING").

Some specific methods of identifying post-attack watermark or fingerprint information 122, and comparing that post-attack watermark or fingerprint information 122 with original watermark or fingerprint information 112, are further described below.

Method of Operation (Embedding Information)

Figure 2:
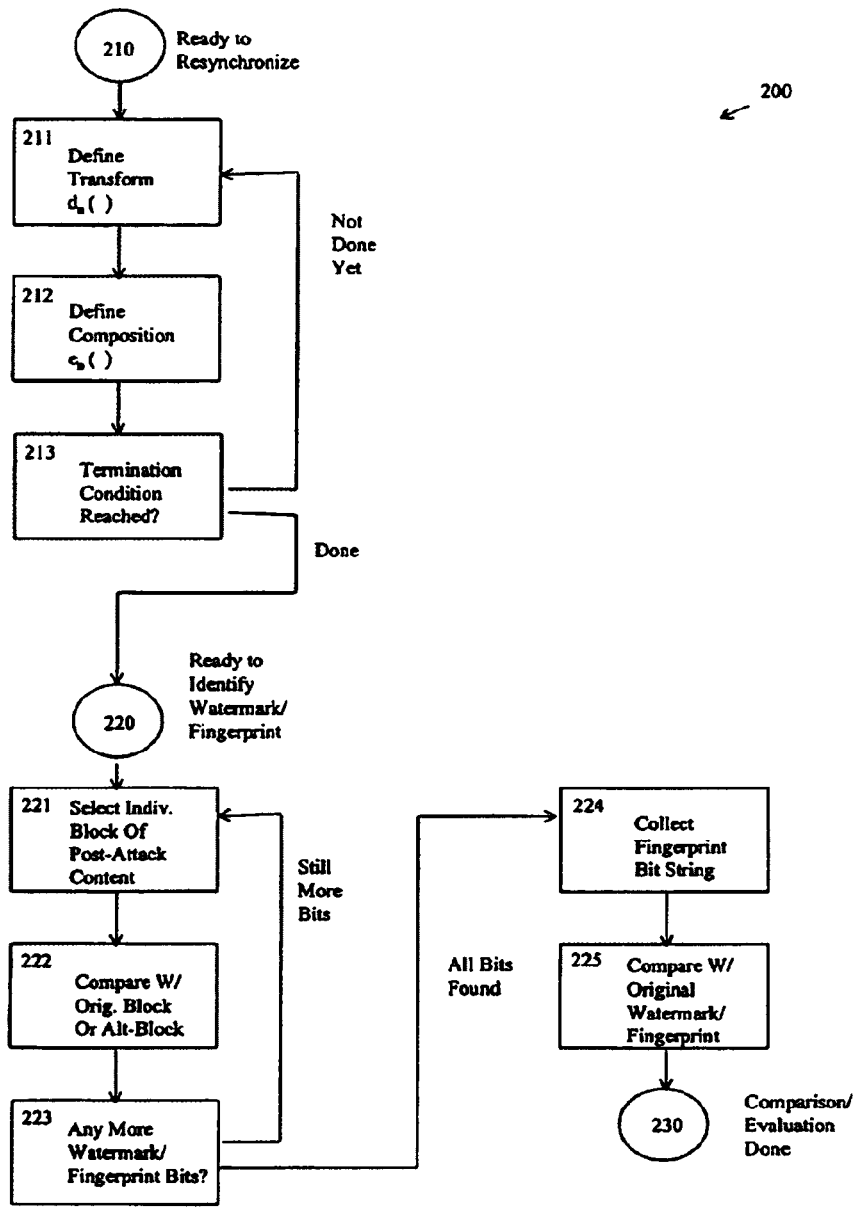
FIG. 2 shows a flow diagram of a method for embedding identifying information in digital content.

FIG. 2 shows a flow diagram of a method for embedding identifying information in digital content.

Although described serially, the flow points and method steps of the method 200 can be performed by separate elements in conjunction or in parallel, whether asynchronously or synchronously, in a pipelined manner, or otherwise. In the context of the invention, there is no particular requirement that the method must be performed in the same order in which this description lists flow points or method steps, except where explicitly so stated.

As described in the incorporated disclosures, the original digital content 111 is combined with watermark or fingerprint information 112 by selecting, in response to the watermark or fingerprint information 112, and as described in related applications for watermarking digital content (including "PARALLEL DISTRIBUTION AND FINGERPRINTING OF DIGITAL CONTENT" and "WATERMARKING AND FINGERPRINTING DIGITAL CONTENT USING ALTERNATIVE BLOCKS TO EMBED INFORMATION"), either the original block or the alt-block from either the original movie or the alt-movie for the media stream.

A function $P_n(X): X \rightarrow \{0, 1\}$ represents the sequence of actual bits of watermark or fingerprint information 112 to be impressed on the original digital content 111, where X represents the media stream (such as for example a movie) being water-marked or fingerprinted, and I(X) represents the sequence of possible locations at which watermark or fingerprint information 112 might be impressed. This has the effect that the watermarked or fingerprinted digital content 113 very likely includes at least some original blocks from the original digital content 111 and at least some alt-blocks associated with (and responsive to) the original digital content 111. Thus, the watermark or fingerprint information 112 is delivered in-band, in that the choice of the original block or alt-block represents at least one bit of such information.

As described in the incorporated disclosure, the watermark or fingerprint information 112 is in fact fingerprint information, in that it can be used to identify at least one specific recipient of the watermarked or fingerprinted digital content 113. However, in the context of the invention there is no specific requirement to this effect, with the effect that the watermark or fingerprint information 112 might in fact be watermark information, in that it can be used only to identify at least one specific sender of the watermarked or fingerprinted digital content 113. Because techniques as described herein are readily applicable to both cases, no distinction is made in the disclosure except where there are significant differences. Those skilled in the art will recognize, after perusal of this application, where there are differences that are not particularly significant. Such differences are within the scope and spirit of the invention, and would be workable, without undue experimentation or further invention.

The system 100 selects the sequence of actual bits of watermark or fingerprint information 112 in such manner that attackers, even when colluding as unauthorized distributors of post-attack digital content 121, cannot readily determine the specific watermark or fingerprint information 112, and cannot readily alter that watermark or fingerprint information 112 to either remove it, without significantly degrading the quality of the post-attack digital content 121. For example, attackers could simply erase all bits of the post-attack digital content 121, and while that would erase all such bits of watermark or fingerprint information 112, it would also render the post-attack digital content 121 substantially useless. This has the effect that unauthorized distributors are forced to choose between (a) degrading the media stream to no longer be commercially valuable, or (b) leaving sufficient fingerprinting or watermarking information detectable in the digital content representing the media stream that unauthorized distribution can be detected with a relatively high degree of confidence.

In one embodiment, the method 200 involves techniques described in the incorporated disclosure, such as described in related applications for watermarking digital content (including "PARALLEL DISTRIBUTION AND FINGERPRINTING OF DIGITAL CONTENT" and "WATERMARKING AND FINGERPRINTING DIGITAL CONTENT USING ALTERNATIVE BLOCKS TO EMBED INFORMATION"). In embodiments involving such techniques, if an attacker seeks to erase a bit from $P_n(X)$, that attacker does not a priori know whether the block it received (or one received by a colluding attacker) is the original block or the alt-block. If there are only two alternatives for the block and the alt-block, and the attacker knows both of those alternatives, the attacker might be able to erase that bit by introducing noise, in the form of selecting between the original block and the alt-block each with probability ½. However, if the attacker does not know the two possibilities for the block and alt-block (that is, the attacker does not know how to replace the received block with the corresponding dual of the block, where the dual of the original block is the alt-block and the dual of the alt-block is the original block), the attacker might be able to erase that bit by replacing the received block with a different block, but the attacker is very unlikely to be able to readily select such a different block that is in fact the dual of the received block. Moreover, the attacker is also likely to degrade the media stream significantly if the attacker tries to hide this lack of ability by chosing a version of the block that is significantly different from both the original block and the alt-block.

This has the effect of presenting the attacker with a problem of erasing information, where the attacker does not know what bits are the information the attacker desires to erase. If the attacker has both the original block and the alt-block available, it knows where the erasable bits are, and can therefore erase it by toggling those bits with probability ½. If the attacker has a received block that is only one of the two dual blocks (that is, either the original block or the alt-block, but not both), the attacker must change the received block substantially, or else leave sufficient information that post-attack analysis can determine whether the received block was, before the attack, the original block or the alt-block.

This is similar in concept to a game in which information is embedded in a movie by placing a token on one of two indistinguishable locations on a large playing field. If an attacker receives copies with tokens on both locations, that attacker can erase information by switching tokens with with probability ½. If an attacker receives only copies with tokens on one of the two locations, that attacker can only be sure of erasing information by moving the token a very large distance from its only one known location. Otherwise, the attacker does not know if post-attack analysis will be able to recover which of the two locations the token was on before the attack.

As described in the incorporated disclosure, techniques shown in the patent application "Watermarking and Fingerprinting Digital Content Using Alternative Blocks to Embed Information" provides a way to embed bits of information without degrading the presentation quality of the media stream too much (that is, by less than readily detectable by viewers). Erasing information by moving the token a very large distance has the effect of degrading more of the presentation quality of the media stream than desirable (that is, the degraded presentation quality will likely be noticeable by viewers).

At a flow point 210, the method 200 is ready to embed identifying information in original digital content 111.

At a step 211, the method 200, in response to a value n, a (preferably unique) identifier of the sender and recipient of the watermarked or fingerprinted digital content 113, generates a sequence of r symbols, each selected from an alphabet of k possibilities. For example, not intended to be limiting in any way, serial number n=314159 might be associated with the sequence of symbols "ACCORDING TO STEVEN SWERNOFSKY THE KALEIDESCAPE MAGIC WORDS ARE SQUAMISH OSSIFRAGE", where r=81 (the number of symbols in the sequence) and k=27 (the number of possible choices for each such symbol). Those skilled in the art will recognize, after perusal of this application, that in a preferred embodiment, the pseudorandom function $R_n( )$ would be very unlikely to generate a sequence of marking symbols with analyzable semantic content, such as given in the example.

To perform this step, the method 200 involves a first pseudo-random function $R_n( ): r \rightarrow k$, where n is the substantially unique identifier of the watermarked or fingerprinted digital content 113. As described herein, $R_n( )$ is preferably cryptographically secure against ciphertext-only attacks. In one embodiment, the function $R_n( )$ is responsive to values derived from the AES family of ciphers, such as for example AES-128 or AES-256, as the AES family of ciphers is known to have passed appropriate tests for statistical pseudo-randomness.

As described in the incorporated disclosure, techniques shown in the provisional patent application "Watermarking and Fingerprinting a Movie for Secure Distribution" include deriving four values of $R_n( )$ in response to each block encrypted using the AES family of ciphers, with the effect that $R_n( )$ can be computed rapidly in response to the identifier n of the media stream X, without having to know the entire media stream X, or any significant portion thereof, at once.

In one embodiment, $R_n( )$ is pseudo-random and equiprobably distributes $r \rightarrow k$, that is, each symbol is statistically about equally likely to appear in each position of the sequence of symbols Z, represented by $R_n( )$. However, in the context of the invention, there is no particular requirement for equiprobability, or even for any restrictions on the a priori probability of generating any particular symbol in the alphabet of k possibilities. This lack of restriction provides for several possible alternative embodiments:

For a first example, not intended to be limiting in any way, $R_n( )$ might be designed with the effect that one selected symbol Z* is much less probable than other symbols that might be generated. In this example, the presence of that rare symbol Z* in a known location in the sequence of symbols, as represented by the sequence of bits P*(X), is telling evidence that one particular recipient was the source of that rare symbol Z*.

For a second example, not intended to be limiting in any way, $R_n( )$ might be designed with the effect that symbols Z have a selected probability distribution, such as for example a Zipf power-law distribution, with the effect that selected sequences of such symbols Z can be statistically tested to determine if they were in fact generated in a manner involving the pseudo-random function $R_n( )$. In this example, if a particular sequence of such symbols Z, as represented by the sequence of bits P*(X), was generated in a manner involving the pseudo-random function $R_n( )$, that would be telling evidence that the copy associated with the identifier n was involved in the generation of P*(X) by an attacker.

For a third example, not intended to be limiting in any way, $R_n( )$ might be designed with the effect that symbols Z have a selected probability distribution in response to n itself, such as for example an arbitrary distribution selected in response to n, with the effect that selected sequences of such symbols Z can be statistically tested to determine if they were in fact generated in a manner involving the pseudo-random function $R_n( )$ for specific n. In this example, if a particular sequence of such symbols Z, as represented by the sequence of bits P*(X), was generated in a manner involving the pseudo-random function $R_n( )$ for specific n, that would be telling evidence that the copy associated with the identifier n was involved in the generation of P*(X).

For a fourth example, not intended to be limiting in any way, $R_n( )$ might be designed with the effect that symbols Z have a probability distribution selected in advance, such as for one example the probability distribution associated with a natural language such as English (or French, or Russian, and the like). This would have the effect that selected sequences of such symbols Z can be statistically tested to determine if they were in fact generated in a manner involving the pseudo-random function $R_n( )$. In this example, if a particular sequence of such symbols Z, as represented by the sequence of bits P*(X), was generated in a manner that was pseudo-random but not according to the probability distribution selected for $R_n( )$, that would be telling evidence that P*(X) was generated by an attacker. Moreover, those marking symbols that were relatively frequently found in P*(X), but relatively rare according to the probability distribution selected for $R_n( )$, might be evidence of which attacker had generated them. Those skilled in the art will recognize, after perusal of this application, that $R_n( )$ need not be a pseudo-random function, but may include any technique by which a sequence of r symbols, each selected from an alphabet of k possibilities, are associated with the unique identifier n. For one example, not intended to be limiting in any way, the sequence of marking symbols Z, as represented by the sequence of bits $P_n(X)$, might be associated with the substantially unique identifier n in response to a memory or mass storage making such association.

In one embodiment, the values of r and k are selected with the effect of optimizing statistical tests for colluding attackers, as described below. For example, not intended to be limiting in any way, in one embodiment r is about 24,000 and k is about 3. Those skilled in the art will recognize that setting k=3 means that the actual bit encoding of k possible marking symbols might for example include the set of bit strings {00, 01, 11}.

At a step 212, the method 200, in response to a set I(X) of possible locations at which bits might be embedded in the watermarked or fingerprinted digital content 113, defines for each location I(X) which bit of $P_n(X)$ is placed there.

To perform this step, the method 200 involves a second pseudo-random function p( ): I(X)→r·(k−1), with the effect that the function p( ) will select about I(X)/r locations within I(X) at which to place bits representing each of the r symbols (but not necessarily exactly that number of locations). Those skilled in the art would recognize, after perusal of this application, that p( ) need not be cryptographically pseudo-random, only statistically pseudo-random, but cryptographically secure against ciphertext-only attacks.

In one embodiment, the function p( ) is responsive to values derived from the AES family of ciphers, such as for example AES-128 or AES-256, as the AES family of ciphers is known to have passed appropriate tests for statistical pseudo-randomness.

Selecting pseudo-random permutations with relatively little information appears to not be cryptographically secure, so if p( ) involved a permutation it would have the effect of using $O(\|X\|)$ bits of information, where $\|X\|$ is the amount of information needed to represent X, the media stream. As described herein, the functions $R_n( )$ and p( ) involve only O(1) bits of information, regardless of the size of X. That is, $R_n( )$ and p( ) do not require substantial amounts of information to be maintained, either in memory or computed in response to X or digital content for X. This has the effect that the invention allows relatively large amounts of information (including watermarking or fingerprinting information or both) to be embedded in digital content for X, while using only $O(f(\|X\|))$ bits of information, where $O(f(\|X\|))<<O(\|X\|)$ as $\|X\|\to\infty$.

Those skilled in the art will recognize, after perusal of this application, that the concept of distributing information to be embedded in the movie X is independent of the technique used for actually embedding that information. This has the effect that, for one example, not intended to be limiting in any way, when techniques are used such as shown in the incorporated disclosure, such as the patent application "Watermarking and Fingerprinting Digital Content Using Alternative Blocks to Embed Information," there might be $O(\|X\|)$ places where bits of information might be embedded, but in the present invention, there are still only O(1) bits of information needed to decide where to embed that information.

Applying p( ) to $R_n( )$ provides the bit sequence $P_n(X)$: I(X)→{0, 1}, that is, one bit for each location for which a bit of identifying information is to be embedded. The function $R_n( )$ provides that the bit sequence $P_n(X)$ is unique to n. The function p( ) provides that the marking symbols Z, represented by the bit sequence $P_n(X)$, cannot be readily individually detected by a recipient of $P_n(X)$. This has the effect that if two or more recipients of $P_{n1}(X)$, $P_{n2}(X)$, and the like, each receive the same marking symbol Z in the $r^{th}$ location of the sequence of r marking symbols, those recipients cannot readily generate a different marking symbol Z' in that $r^{th}$ location.

In alternative embodiments, the function p( ) may be replaced with any technique making it sufficiently difficult for an attacker to erase the marking symbols Z from the bit sequence $P_n(X)$. The following are examples, not intended to be limiting in any way, which might be alternatives:

The function p( ) may be constructed, as described above, using a pseudo-random permutation of the bit sequence $P_n(X)$ that is cryptographically secure against ciphertext-only attacks.

The function p( ) may be constructed, as described above, using a cryptographically secure invertible transformation of the bit sequence $P_n(X)$.

The marking symbols Z need not have any specific limitations. However, those skilled in the art will recognize, after perusal of this application, that two particular sets of marking symbols Z are advantageous.

A first advantageous set of marking symbols Z are those symbols of fixed length, having only at most one transition from logical "0" to logical "1," such as for example the set {000, 001, 011, 111}. A set of colluding attackers having multiple ones of such symbols Z, and able to form logical combinations thereof, would not be able to manufacture any new such symbols Z (and thus erase symbols Z they received), because they would not be able to form any new such symbols Z with the logical tools available.

A second advantageous set of marking symbols Z are those symbols of variable length B*, having only a single transition from logical "0" to logical "1" at the beginning or end of such marking symbols, such as for example the set {000, 111, 00000, 11111, 0000000, 1111111, 00000000000, 111111111111}. A set of colluding attackers having multiple ones of such symbols Z, and able to form logical combinations thereof, would not be able to readily manufacture any new such symbols Z (and thus erase symbols Z they received), because they would not know where such marking symbols were intended to begin or end.

A third advantageous set of marking symbols Z are those symbols of variable length B*, having only a few possible transitions from logical "0" to logical "1" within such marking symbols, such as for example the set {00000, 11111, 00010000, 11101111}. A set of colluding attackers having multiple ones of such symbols Z, and able to form logical combinations thereof, would not be able to readily manufacture any new such symbols Z (and thus erase symbols Z they received), because they would not know where such marking symbols were intended to begin or end or where such marking symbols were intended to have transitions from logical "0" to logical "1" within such marking symbols.

Those skilled in the art will recognize, after perusal of this application, that when residual information indicates more than one likely possibility for the marking symbol Z that was embedded in $P_n(X)$ and recovered from $P^*(X)$, the fact of that more than one likely possibility is itself information that might be used to determine at least one of a set of attackers. This might occur where there are two possibilities Z1 and Z2, each of which is about equally likely to be the recovered marking symbol Z. More generally, the recovered marking symbol Z might represent a probability vector of possible values for corresponding portions of $P_n(X)$, or another weighted vector of possible corresponding portions of $P_n(X)$, with the effect that determining at least one of a set of attackers might be responsive to such a vector, rather than to only a single possible recovered marking symbol Z.

At a step 213, the method 200, in response to the bits $P_n(X)$ determined in the previous step, embeds those bits in the original digital content 111 as watermark or fingerprint information 112, to generate watermarked or fingerprinted digital content 113.

At a flow point 220, the method 200 has generated the watermarked or fingerprinted digital content 113.

As described above, in the watermarked or fingerprinted digital content 113, the sequence of actual bits $P_n(X)$ of watermark or fingerprint information 112 represents a sequence of marking symbols Z, each selected from an alphabet of k possible marking symbols, where $P_n(X)$ is selected in response to a (preferably unique) identifier n of the particular copy of the original digital content 111, with the effect that the sequence of marking symbols Z is unique to that particular copy. As noted above, the identifier n might identify the sender of the digital content, the recipient thereof, or an individual event such as a selected sender/recipient interaction or a selected presentation of the media stream, such as an individual presentation at a movie theater.

As described above, in the watermarked or fingerprinted digital content 113, the sequence of marking symbols Z, each selected from an alphabet of k possible marking symbols, is further encoded within the sequence of actual bits $P_n(X)$ of watermark or fingerprint information 112. Bits representing those marking symbols Z are distributed pseudo-randomly using the function p( ) within the sequence of actual bits $P_n(X)$ of watermark or fingerprint information 112, with the effect that the marking symbols cannot readily be manufactured without at least one colluding unauthorized distributor (attacker) having received that marking symbol. (An attacker might have multiple received copies and thus "collude" with himself.) As described below, the pseudo-random distribution need only be statistically pseudo-random, not necessarily cryptographically pseudo-random, but need be cryptographically secure against ciphertext-only attacks.

No attacker can readily generate any marking symbols Z not already embedded in the watermarked or fingerprinted digital content 113. This has the effect that a set of colluding attackers can determine only the union of those marking symbols Z embedded in watermarked or fingerprinted digital content 113 received by one or more such colluding attackers, but cannot determine any individual marking symbols Z embedded in watermarked or fingerprinted digital content 113, if those individual marking symbols Z were not received by any of the colluding attackers.

This has the effect that any distributed digital content derived from the original digital content 111 (and still having commercial value) includes at least some individual marking symbols Z traceable to at least one of the colluding attackers. As shown below, probability theory allows the method to trace that individual marking symbol Z, with the effect that the method can identify at least one colluding unauthorized distributor with relative confidence that the identified party is truthfully an unauthorized distributor and not falsely accused.

Method of Operation (Detecting Collusion)

Figure 3:
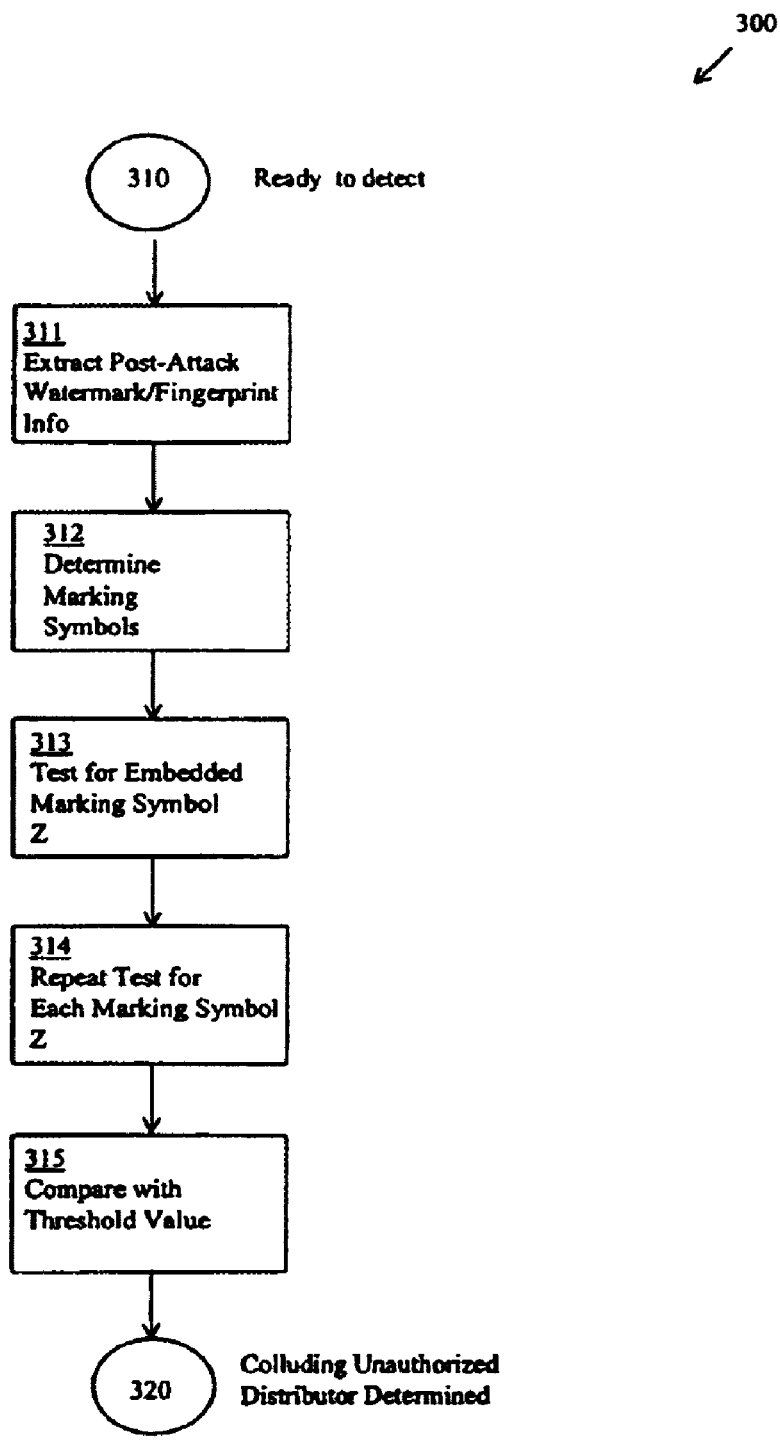
FIG. 3 shows a flow diagram of a method for detecting collusion among multiple recipients of fingerprinted information.

FIG. 3 shows a flow diagram of a method for detecting collusion among multiple recipients of fingerprinted information.

Although described serially, the flow points and method steps of the method 300 can be performed by separate elements in conjunction or in parallel, whether asynchronously or synchronously, in a pipelined manner, or otherwise. In the context of the invention, there is no particular requirement that the method must be performed in the same order in which this description lists flow points or method steps, except where explicitly so stated.

At a flow point 310, the method 300 is ready to detect if a set of post-attack digital content 121 is derivative of the original digital content 111, in response to post-attack watermark or fingerprint information 122 identified in response to the post-attack digital content 121, and in response to watermark or fingerprint information 112 associated with the original digital content 111.

At a step 311, the method 300 extracts residual post-attack watermark or fingerprint information 122 from the post-attack digital content 121. In one embodiment, the method 300 selects a block such as used in a technique described in a related application ("RECOVERING FROM DE-SYNCHRONIZATION ATTACKS AGAINST WATERMARKING AND FINGERPRINTING") in the incorporated disclosure. As part of this step, the method 300 collects the actual bits $P^*(X)$ whose sequence thereof is the post-attack fingerprinting or watermarking information 122 identified in response to the post-attack digital content 121.

At a step 312, the method 300 determines the marking symbols Z represented by the post-attack fingerprinting or watermarking information 122 $P^*(X)$, with the effect of producing a word of length r, each symbol of which is selected from an alphabet of k possibilities.

At a step 313, for each such marking symbol Z, the method 300 performs one or more statistical tests to evaluate whether the embedded marking symbol Z is detectable in the post-attack fingerprinting or watermarking information 122.

For one example, not intended to be limiting in any way, each such marking symbol Z is assigned a weighted point-count, where each distributor who might possibly be accused (that is, each serial number associated with a possible unauthorized distributor, that is, each serial number associated with a recipient) is assigned a first (preferably positive) weighted value +E if the specific marking symbol Z is present in the post-attack fingerprinting or watermarking information 122 at the $r^{th}$ position, and a second (preferably negative) weighted value −F if the specific marking symbol Z is not present in the post-attack fingerprinting or watermarking information 122 at the $r^{th}$ position. In one embodiment, the weighted values E and F are selected such that an innocent party, having only a random selection of marking symbols Z present in the post-attack fingerprinting or watermarking information 122, will have an known expected total of the weighted values E and F, when substantially all marking symbols Z are considered.

In alternative embodiments, there might be more than two such weighted values, where such weighted values are assigned according to different possibilities:

Different weighted values might be assigned to different marking symbols Z responsive to the nature of the marking symbol Z, with the effect that presence of a rare marking symbol Z* would provide a larger weighted total and more telling evidence of a specific identifier n of the original bit sequence $P_n(X)$; Different weighted values might be assigned to marking symbols Z in response to the relative position of the marking symbol Z in the post-attack fingerprinting or watermarking information 122 $P^*(X)$, with the effect that presence of a rare marking symbol Z* would provide a larger weighted total and more telling evidence of a specific identifier n of the original bit sequence $P_n(X)$ if found in a selected location.

Those skilled in the art would recognize that the values +E and −F might be selected in response to the specific marking symbol Z. For one example, not intended to be limiting in any way, the specific marking symbols Z might be selected with non-uniform probability, with the effect that at least one such marking symbol Z* might be substantially more rare than other such marking symbols Z?Z*. In such cases, the value +E might be assigned a substantially more positive value (indicating that the presence of the relatively rare marking symbol Z* is therefore more likely to indicate a colluding attacker).

For a first example, not intended to be limiting in any way, E=1, and F=−p/(1−p), where p is the probability of the specific marking symbol Z, the known expected total is zero for innocent parties, and the known expected total is 1−(p/(1−p))(k−1) for actually guilty attackers, where k is the parameter described above. In one embodiment, k is preferably about 3, but in alternative embodiments might be between about 2 and about 30. Those skilled in the art will recognize that where p<<1, the expected total→1 as p→0.

At a step 314, the method 300 repeats the previous step for each marking symbol Z found at each one of a relatively large number r of possible locations. In one embodiment, r is preferably about 24,000, but in alternative embodiments might be any relatively large number, such as for example several thousand. According to probability theory, this has the effect that the total of such expected totals is very unlikely to deviate from zero for innocent parties, and very unlikely to be near zero for at least one actual attacker.

At a step 315, the method 300 compares a result of the previous step with a threshold value, with the effect of determining with relatively high confidence whether any selected recipient of the original digital content 111 is an innocent party or an actual attacker. In a preferred embodiment, the threshold value might be selected so that an innocent party would have a total at least 12 standard deviations above the expected total, thus reducing the likelihood that an innocent party would be falsely accused to well below 1 chance in a trillion (as a rough estimate).

At a flow point 320, the method 300 has determined at least one colluding unauthorized distributor for any actually unauthorized copy of the original digital content 111, in response to post-attack watermark or fingerprint information 122 identified in response to the post-attack digital content 121, and in response to watermark or fingerprint information 112 associated with the original digital content 111.

Generality of the Invention

The invention is useful for, and has sufficient generality for, applications other than distribution of streaming media, and to other than distribution of digital content. For example, the invention is also generally useful for applications in which security of datasets or identifying recipients of those datasets is desired.

Although preferred embodiments are disclosed herein, many variations are possible which remain within the concept, scope, and spirit of the invention. These variations would become clear to those skilled in the art after perusal of this application.

As noted above, the invention is not restricted to movies, but is also applicable to other media streams, such as for example animation or sound, as well as to still media, such as for example pictures or illustrations, and to databases and other collections of information.

The invention is not restricted to media streams, but is also applicable to other communication signals in which watermark or fingerprint information can be embedded, such as for example message packets including timestamps or other non-critical bit sequences.

The invention is not restricted to digital content, but is also applicable to other information signals in which watermark or fingerprint information can be embedded, such as for example AM, FM, PCM, or other modulation forms for analog communication or storage of information.

The invention is not restricted to watermark or fingerprinting information embedded using specific symbols, but is also applicable to other forms of embedding watermark or fingerprint information, such as for example statistically testable pseudo-randomness with selected distributions (as described above).

The invention is not restricted to detecting unauthorized distributors, but is also applicable to other forms of discovering digital content that is derivative of a common source. For example, not intended to be limiting in any way, the invention might be used in contexts where (1) two communicators desire to determine if they have substantially similar shared data, (2) it is desired to determine if two copies of data are substantially similar such as in a redundant storage system, (3) it is desired to audit or otherwise trace digital content in its distribution or storage, such as for regulatory purposes, for evidentiary purposes, for implementing digital monetary systems, for tracing changes to digital content, and the like.

Those skilled in the art will recognize, after perusal of this application, that these alternative embodiments are illustrative and in no way limiting.

The invention claimed is:

1. A method, including steps of
   associating a sequence of marking symbols with digital content, said sequence including information substantially unique to a selected copy of said digital content, at least one marking symbol not included in said sequence not being reliably manufactured without a copy thereof; and
   asymmetrically distributing information representing said marking symbols among a set of locations for said digital content and generating a set of marked digital content in response thereto, said steps of asymmetrically distributing information not being reliably reversible by a recipient of said marked digital content, whereby said recipient cannot reliably determine said sequence of marking symbols.

2. A method as in claim 1, wherein said digital content represents at least a portion of a media stream.

3. A method as in claim 1, wherein said digital content represents at least a portion of an audio or visual presentation.

4. A method as in claim 1, wherein said information substantially unique to a selected copy of said digital content includes fingerprint information.

5. A method as in claim 1, wherein said information substantially unique to a selected copy of said digital content includes information sufficient to identify a substantially unique authorized distributor of said digital content.

6. A method as in claim 1, wherein said information substantially unique to a selected copy of said digital content includes information sufficient to identify a substantially unique authorized redistribution event for said digital content.

7. A method as in claim 1, wherein said information substantially unique to a selected copy of said digital content includes information sufficient to identify a substantially unique presentation of said digital content.

8. A method as in claim 1, wherein said information substantially unique to a selected copy of said digital content includes information sufficient to identify a substantially unique presentation of a media stream, said presentation of said media stream including an analog encoding of said digital content.

9. A method as in claim 1, wherein
said information substantially unique to a selected copy of said digital content includes information sufficient to identify a substantially unique presentation of a media stream,
said presentation of said media stream including an encoding of said media stream in a form substantially different from said selected copy of said digital content.

10. A method as in claim 1, wherein said information substantially unique to a selected copy of said digital content includes watermark information.

11. A method as in claim 1, wherein said steps of asymmetrically distributing information are not one-to-one.

12. A method as in claim 1, wherein said steps of asymmetrically distributing information place information at a first set of locations for a first said recipient and a second set of locations for a second said recipient, said first set of locations and said second set of locations being substantially distinct.

13. A method as in claim 1, wherein said steps of asymmetrically distributing information include, for at least some locations of said marked digital content, steps of pseudo-randomly selecting at least a portion of said marking symbols to be embedded at said locations.

14. A method as in claim 13, wherein said portion of said marking symbols are individual bits of embedded information.

15. A method as in claim 13, wherein said at least one said portion of said marking symbols defines an individual bit of a representation of at least one of said marking symbols.

16. A method as in claim 1, wherein said steps of asymmetrically distributing information include steps of selecting information to be embedded at locations in digital content, said steps of selecting information being responsive only to substantially local information regarding said locations.

17. A method as in claim 16, wherein a number of locations selected at which to embed a particular bit involved in representing at least one said marking symbol are different for at least two distinct ones of said particular bits.

18. A method as in claim 16, wherein a number of locations selected at which to embed bits involved in representing each said marking symbol is different for at least two distinct ones of said marking symbols.

19. A method as in claim 16, wherein locations selected at which to embed at least one bit involved in representing at least one said marking symbol are pseudo-randomly selected.

20. A method as in claim 1, wherein said steps of asymmetrically distributing information include steps of
selecting said set of locations in response to a function which independently assigns each said location to represent a selected portion of one of said sequence of marking symbols.

21. A method as in claim 20, wherein said function includes a function responsive to substantially only an identifier for said location for said digital content.

22. A method as in claim 20, wherein said function includes a function responsive to substantially only local features of said digital content.

23. A method as in claim 1, wherein said steps of asymmetrically distributing information include steps of selecting said set of locations in response to a function which probabilistically assigns each said location to represent a selected portion of one of said sequence of marking symbols.

24. A method as in claim 23, wherein said function includes a function responsive to substantially only an identifier for said location for said digital content.

25. A method as in claim 23, wherein said function includes a function responsive to substantially only local features of said digital content.

26. A method as in claim 23, wherein said probabilistic assignment is responsive to a nonuniform distribution of said marking symbols.

27. A method as in claim 23, wherein said probabilistic assignment is responsive to a fixed distribution of said marking symbols.

28. A method as in claim 23, wherein said selected portion includes more than zero bits of a representation of said one marking symbol.

29. A method as in claim 23, including a second sequential order for said set of locations, said one sequential order and said second sequential order being substantially distinct.

30. A method as in claim 23, wherein said probabilistic assignment is responsive to a uniform distribution of said marking symbols.

31. A method as in claim 23, wherein said probabilistic assignment is responsive to a distribution of said marking symbols, said distribution being substantially identical for each said recipient of said marked digital content.

32. A method, including steps of
associating a sequence of marking symbols with digital content for a media stream X, said sequence including information substantially unique to a selected copy of said digital content, at least one marking symbol not included in said sequence not being reliably manufactured without a copy thereof; and
distributing information representing said marking symbols among a set of locations for said digital content and generating a set of marked digital content in response thereto, whereby a recipient of said marked digital content cannot reliably determine said sequence of marking symbols, said steps of distributing using $O(f(\|X\|))$ bits of information, where $O(f(\|X\|))$ is substantially less than $O(\|X\|)$ as $\|X\| \to \infty$.

33. A method as in claim 32, wherein said information substantially unique to a selected copy of said digital content includes information sufficient to identify a substantially unique authorized distributor of said media stream.

34. A method as in claim 32, wherein said information substantially unique to a selected copy of said digital content includes information sufficient to identify a substantially unique authorized redistribution event for said media stream.

35. A method as in claim 32, wherein said information substantially unique to a selected copy of said digital content includes information sufficient to identify a substantially unique presentation of said media stream.

36. A method as in claim 32, wherein said information substantially unique to a selected copy of said digital content includes information sufficient to identify a substantially unique presentation of said media stream, said presentation of said media stream including an analog encoding of said media stream.

37. A method as in claim 32, wherein
said information substantially unique to a selected copy of said digital content includes information sufficient to identify a substantially unique presentation of said media stream,
said presentation of said media stream including an encoding of said media stream in a form substantially different from said selected copy of said digital content.

38. A method as in claim 32, wherein said steps of distributing are not one-to-one reversible.

39. A method as in claim 32, wherein said steps of distributing place information at a first set of locations for a first said recipient and a second set of locations for a second said recipient, said first set of locations and said second set of locations being substantially distinct.

40. A method as in claim 32, wherein said steps of distributing include, for at least some locations of said marked digital content, steps of pseudo-randomly selecting at least a portion of said marking symbols to be embedded at said locations.

41. A method as in claim 40, wherein said elements of said marked digital content are individual bits of embedded information.

42. A method as in claim 40, wherein said at least one said portion of said marking symbols defines an individual bit of a representation of at least one of said marking symbols.

43. A method as in claim 32, wherein said steps of distributing include steps of selecting information to be embedded at locations in digital content, said steps of selecting information being responsive only to substantially local information regarding said locations.

44. A method as in claim 43, wherein a number of locations selected at which to embed a particular bit involved in representing at least one said marking symbol are different for at least two distinct ones of said particular bits.

45. A method as in claim 43, wherein a number of locations selected at which to embed bits involved in representing each said marking symbol is different for at least two distinct ones of said marking symbols bits.

46. A method as in claim 43, wherein locations selected at which to embed bits involved in representing at least one said marking symbol are pseudo-randomly selected.

47. A method as in claim 32, wherein said steps of distributing include steps of
selecting said set of locations in response to a function which independently assigns each said location to represent a selected portion of one of said sequence of marking symbols.

48. A method as in claim 47, wherein said function includes a function responsive to substantially only an identifier for said location for said digital content.

49. A method as in claim 47, wherein said function includes a function responsive to substantially only local features of said digital content.

50. A method as in claim 32, wherein said steps of distributing include steps of
selecting said set of locations in response to a function which probabilistically assigns each said location to represent a selected portion of one of said sequence of marking symbols.

51. A method as in claim 50, wherein said function includes a function responsive to substantially only an identifier for said location for said digital content.

52. A method as in claim 50, wherein said function includes a function responsive to substantially only local features of said digital content.

53. A method as in claim 50, wherein said probabilistic assignment is responsive to a nonuniform distribution of said marking symbols.

54. A method as in claim 50, wherein said probabilistic assignment is responsive to a selected distribution of said marking symbols, said selected distribution being responsive to said information sufficient to identify said recipient.

55. A method as in claim 50, wherein said selected portion includes more than zero bits of a representation of said one marking symbol.

56. A method as in claim 50, including a second sequential order for said set of locations, said one sequential order and said second sequential order being substantially distinct.

57. A method as in claim 50, wherein said probabilistic assignment is responsive to a uniform distribution of said marking symbols.

58. A method as in claim 50, wherein said probabilistic assignment is responsive to a distribution of said marking symbols, said distribution being substantially identical for each said recipient of said marked digital content.

59. A method, including steps of associating a sequence of marking symbols with at least one copy of digital content, said sequence including information substantially unique to each said copy of said digital content, at least one marking symbol not included in said sequence not being reliably manufactured without a copy thereof;
examining information representing a particular sequence of marking symbols from among a set of locations for received digital content, and detecting from said information residual information, wherein said steps of examining or said steps of detecting are responsive to asymmetrically distributed information representing said marking symbols associated with at least one said copy of digital content;
in response to said residual information, identifying at least one of a set of senders of said digital content, wherein said steps of identifying include a relatively high degree of confidence of identifying at least said one unauthorized distributor while concurrently including a relatively high degree of confidence of not falsely accusing any innocent party of being an unauthorized distributor.

60. A method as in claim 59, wherein said digital content represents at least a portion of a media stream.

61. A method as in claim 59, wherein said digital content represents at least a portion of an audio or visual presentation.

62. A method as in claim 59, wherein said information substantially unique to a selected copy of said digital content includes fingerprint information.

63. A method as in claim 59, wherein said information substantially unique to a selected copy of said digital content includes information sufficient to identify a substantially unique authorized distributor of said digital content.

64. A method as in claim 59, wherein said information substantially unique to a selected copy of said digital content includes information sufficient to identify a substantially unique authorized redistribution event for said digital content.

65. A method as in claim 59, wherein said information substantially unique to a selected copy of said digital content includes watermark information.

66. A method as in claim 59, wherein said information substantially unique to a selected copy of said digital content includes information sufficient to identify a substantially unique presentation of said digital content.

67. A method as in claim 59, wherein said information substantially unique to a selected copy of said digital content includes information sufficient to identify a substantially unique presentation of a media stream, said presentation of said media stream including an analog encoding of said digital content.

68. A method as in claim 59, wherein
said information substantially unique to a selected copy of said digital content includes information sufficient to identify a substantially unique presentation of a media stream,
said presentation of said media stream including an encoding of said digital content in a form substantially different from said selected copy of said digital content.

69. A method as in claim 59, wherein said relatively high degree of confidence exceeds about 99% confidence when an unauthorized distributor has access to less than about 100 copies of said sequences of marking symbols.

70. A method as in claim 59, wherein said steps of detecting residual information are performed separately for each said marking symbol in its place in substantially said sequential order.

71. A method as in claim 59, wherein said steps of examining are performed separately for each said marking symbol in its place in substantially said sequential order.

72. A method as in claim 59, wherein at least one of said steps of examining or said steps of identifying are responsive to a function which probabilistically assigns each said location to represent a selected portion of one of said sequence of marking symbols.

73. A method as in claim 72, wherein said function includes a function responsive to substantially only an identifier for said location for said digital content.

74. A method as in claim 72, wherein said function includes a function responsive to substantially only local features of said digital content.

75. A method as in claim 72, wherein said probabilistic assignment is responsive to a nonuniform distribution of said marking symbols.

76. A method as in claim 72, wherein said probabilistic assignment is responsive to a selected distribution of said marking symbols, said selected distribution being responsive to said information sufficient to identify said at least one of said set of senders of said digital content.

77. A method as in claim 72, wherein said selected portion includes more than zero bits of a representation of said one marking symbol.

78. A method as in claim 72, wherein said probabilistic assignment is responsive to a uniform distribution of said marking symbols.

79. A method as in claim 72, wherein said probabilistic assignment is responsive to a distribution of said marking symbols, said distribution being substantially identical for each said recipient of said marked digital content.

80. A method as in claim 59, wherein at least one of said steps of examining or said steps of identifying include steps of
for each said marking symbol, determining whether said residual information indicates the presence, in said sequence of marking symbols of a restricted sequence of said marking symbols, said restricted sequence including at least one location at which one or more such marking symbols are detectable responsive to said residual information;
in response to a result of said steps of determining, performing a statistical test for each said marking symbol in said sequence of marking symbols, said statistical test being adapted to identify marking symbols in response to said asymmetrically distributed information representing said marking symbols;
in response to a result of said statistical test, identifying a set of senders of said digital content, said set having the property that members are statisfically likely to have sent at least a portion of said digital content and that nonsenders of any portion of said digital content are statistically unlikely to be members of said set of senders.

81. A method as in claim 80, wherein said statistical test includes a measure of likelihood that said marking symbol was derived from at least a portion of said digital content from a member of said set of senders.

82. A method as in claim 80, wherein said statistical test includes a nonuniformly weighted summation responsive to the presence of each said marking symbol in said sequence of marking symbols.

83. A method as in claim 80, wherein said statistical test includes a value responsive to a selected probability of the presence of said marking symbol, the presence of said marking symbols having a nonuniform distribution.

84. A method as in claim 80, wherein said statistical test is responsive to a selected distribution of said marking symbols, said selected distribution being responsive to said information sufficient to identify said recipient.

85. A method as in claim 80, wherein said steps of determining presence are performed separately for each said marking symbol in its place in substantially said sequential order.

86. A method as in claim 80, wherein said steps of performing a statistical test are performed separately for each said marking symbol in its place in substantially said sequential order.

87. A method, including steps of
associating a sequence of marking symbols with digital content for a media stream X, said sequence including information substantially unique to a selected copy of said digital content, at least one marking symbol not included in said sequence not being reliably manufactured without a copy thereof; and
examining information representing said sequence of marking symbols from among a set of locations for said digital content, and detecting from said set of locations residual information, said steps of examining using $O(f(\|X\|))$ bits of information, where $O(f(\|X\|))$ is substantially less than $O(\|X\|)$ as $\|X\| \to \infty$, wherein said steps of examining or said steps of detecting are responsive to asymmetrically distributed information representing said marking symbols associated with at least one said copy of digital content;
in response to said residual information, identifying at least one of a set of senders of said digital content.

88. A method as in claim 87, wherein said information substantially unique to a selected copy of said digital content includes information sufficient to identify a substantially unique authorized distributor of said media stream.

89. A method as in claim 87, wherein said information substantially unique to a selected copy of said digital content includes information sufficient to identify a substantially unique authorized redistribution event for said media stream.

90. A method as in claim 87, wherein said information substantially unique to a selected copy of said digital content includes information sufficient to identify a substantially unique presentation of said media stream.

91. A method as in claim 87, wherein said information substantially unique to a selected copy of said digital content includes information sufficient to identify a substantially unique presentation of said media stream, said presentation of said media stream including an analog encoding of said media stream.

92. A method as in claim 87, wherein
said information substantially unique to a selected copy of said digital content includes information sufficient to identify a substantially unique presentation of said media stream,
said presentation of said media stream including an encoding of said media stream in a form substantially different from said selected copy of said digital content.

93. A method as in claim 87, wherein said steps of detecting residual information are performed separately for each said marking symbol in its place in substantially said sequential order.

94. A method as in claim 87, wherein said steps of examining are performed separately for each said marking symbol in its place in substantially said sequential order.

95. A method as in claim 87, wherein at least one of said steps of examining or said steps of identifying include steps of
selecting said set of locations in response to a function which probabilistically assigns each said location to represent a selected portion of one of said sequence of marking symbols.

96. A method as in claim 95, wherein said function includes a function responsive to substantially only an identifier for said location for said digital content.

97. A method as in claim 95, wherein said function includes a function responsive to substantially only local features of said digital content.

98. A method as in claim 95, wherein said probabilistic assignment is responsive to a nonuniform distribution of said marking symbols.

99. A method as in claim 95, wherein said probabilistic assignment is responsive to a selected distribution of said marking symbols, said selected distribution being responsive to said information sufficient to identify said at least one of said set of senders of said digital content.

100. A method as in claim 95, wherein said selected portion includes more than zero bits of a representation of said one marking symbol.

101. A method as in claim 87, wherein at least one of said steps of examining or said steps of identifying include steps of
for each said marking symbol, determining whether said residual information indicates the presence, in said sequence of marking symbols of a restricted sequence of said marking symbols,
said restricted sequence including at least one location at which one or more such marking symbols are detectable responsive to said residual information,
said steps of determining being responsive to asymmetrically distributed information representing said marking symbols;
in response to a result of said steps of determining, performing a statistical test for each said marking symbol in said sequence of marking symbols;
in response to a result of said statistical test, identifying a set of senders of said digital content, said set having the property that members are statistically likely to have sent at least a portion of said digital content and that nonsenders of any portion of said digital content are statistically unlikely to be members of said set of senders.

102. A method as in claim 101, wherein said statistical test includes a measure of likelihood that said marking symbol was derived from at least a portion of said digital content from a member of said set of senders.

103. A method as in claim 101, wherein said statistical test includes a nonuniformly weighted summation responsive to the presence of each said marking symbol in said sequence of marking symbols.

104. A method as in claim 101, wherein said statistical test includes a value responsive to a selected probability of the presence of said marking symbol, the presence of said marking symbols having a nonuniform distribution.

105. A method as in claim 101, wherein said statistical test is responsive to a selected distribution of said marking symbols, said selected distribution being responsive to said information sufficient to identify said at least one of said set of senders of said digital content.

106. A method as in claim 101, wherein said steps of determining presence are performed separately for each said marking symbol in its place in substantially said sequential order.

107. A method as in claim 101, wherein said steps of performing a statistical test are performed separately for each said marking symbol in its place in substantially said sequential order.

108. A method, including steps of
associating a sequence of marking symbols with at least one copy of digital content, said sequence including information substantially unique to each said copy of said digital content, at least one marking symbol not included in said sequence not being reliably manufactured without a copy thereof;
examining information representing a particular sequence of marking symbols from among a set of locations for received digital content, and detecting from said information residual information;
in response to said residual information, identifying at least one of a set of unauthorized distributors of said digital content, wherein said steps of identifying include a relatively high degree of confidence of identifying said one unauthorized distributor while concurrently including a relatively high degree of confidence of not falsely accusing any innocent party of being an unauthorized distributor;
wherein said information substantially unique to a selected copy of said digital content includes information sufficient to identify at least one of: a substantially unique authorized distributor of said digital content, a substantially unique authorized redistribution event for said digital content, a substantially unique presentation of said digital content.

109. A method, including steps of
associating a sequence of marking symbols with at least one copy of digital content, said sequence including information substantially unique to each said copy of said digital content, at least one marking symbol not included in said sequence not being reliably manufactured without a copy thereof;
examining information representing a particular sequence of marking symbols from among a set of locations for received digital content, and detecting from said information residual information, said steps of examining being responsive to asymmetrically distributed information representing said marking symbols;

in response to said residual information, identifying at least one of a set of unauthorized distributors of said digital content, wherein said steps of identifying include a relatively high degree of confidence of identifying said one unauthorized distributor while concurrently including a relatively high degree of confidence of not falsely accusing any innocent party of being an unauthorized distributor;

wherein at least one of said steps of examining or said steps of identifying include steps of for each said marking symbol, determining whether said residual information indicates the presence, in said sequence of marking symbols of a restricted sequence of said marking symbols, said restricted sequence including at least one location at which one or more such marking symbols are detectable responsive to said residual information;

in response to a result of said steps of determining, performing a statistical test for each said marking symbol in said sequence of marking symbols;

in response to a result of said statistical test, identifying a set of senders of said digital content, said set having the property that members are statistically likely to have sent at least a portion of said digital content and that nonsenders of any portion of said digital content are statistically unlikely to be members of said set of senders.

110. A method, including steps of associating a sequence of marking symbols with digital content for a media stream X, said sequence including information substantially unique to a selected copy of said digital content, at least one marking symbol not included in said sequence not being reliably manufactured without a copy thereof; and examining information representing a particular sequence of marking symbols from among a set of locations for received digital content, and detecting from said information residual information, wherein said steps of examining or said steps of detecting using $O(f(\|X\|))$ bits of information, where $O(f(\|X\|))$ is substantially less than $O(\|X\|)$ as $\|X\| \to \infty$;

in response to said residual information, identifying at least one of a set of senders of said digital content, wherein said steps of identifying include steps of for each said marking symbol, determining whether said residual information indicates the presence, in said sequence of marking symbols of a restricted sequence of said marking symbols, said restricted sequence including at least one location at which one or more such marking symbols are detectable responsive to said residual information;

in response to a result of said steps of determining, performing a statistical test for each said marking symbol in said sequence of marking symbols;

in response to a result of said statistical test, identifying a set of senders of said digital content, said set having the property that members are statistically likely to have sent at least a portion of said digital content and that nonsenders of any portion of said digital content are statistically unlikely to be members of said set of senders.

* * * * *